US008341607B2

(12) United States Patent
Stoodley et al.

(10) Patent No.: US 8,341,607 B2
(45) Date of Patent: Dec. 25, 2012

(54) CONDENSING PATTERN MATCHER GENERATION FOR INTERMEDIATE LANGUAGE PATTERNS

(75) Inventors: Kevin A. Stoodley, Richmond Hill (CA); Arie Tal, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1322 days.

(21) Appl. No.: 12/047,866

(22) Filed: Mar. 13, 2008

(65) Prior Publication Data

US 2009/0235238 A1  Sep. 17, 2009

(51) Int. Cl.
*G06F 9/45* (2006.01)
(52) U.S. Cl. .................. 717/140; 717/136; 717/143
(58) Field of Classification Search .................. None
See application file for complete search history.

(56) References Cited

U.S. PATENT DOCUMENTS

| | | | |
|---|---|---|---|
| 6,523,171 B1* | 2/2003 | Dupuy et al. ............ | 717/136 |
| 6,748,588 B1* | 6/2004 | Fraser et al. ............ | 717/146 |
| 6,829,759 B1* | 12/2004 | Davis et al. ............ | 717/140 |
| 7,203,931 B2* | 4/2007 | Minamide et al. ........ | 717/136 |
| 7,207,036 B2* | 4/2007 | Charnell ............... | 717/140 |
| 2004/0154007 A1* | 8/2004 | Koizumi et al. ......... | 717/151 |
| 2006/0156286 A1 | 7/2006 | Morgan et al. | |
| 2006/0206876 A1 | 9/2006 | Barton et al. | |
| 2006/0225057 A1* | 10/2006 | Geisinger ............... | 717/143 |
| 2007/0016889 A1 | 1/2007 | Miyazaki | |
| 2007/0022409 A1* | 1/2007 | Levenshteyn ........... | 717/136 |
| 2007/0169030 A1* | 7/2007 | Tarditi et al. ............ | 717/140 |
| 2007/0169031 A1* | 7/2007 | Harris ................. | 717/140 |
| 2007/0240138 A1* | 10/2007 | Chess et al. ............ | 717/143 |
| 2008/0155519 A1* | 6/2008 | Mulvaney et al. ........ | 717/143 |

OTHER PUBLICATIONS

John R. Levine, Tony Mason & Doug Brown, lex & yacc, Feb. 1995, ISBN 1-56592-000-7, chapters 1 and 2.*
Mikael Pettersson, A Term Pattern-Match Compiler Inspired by Finite Automata Theory, Department of Computer Science, Linkoping University, Sweden, 1992, pp. 2-8.*
Jesper Jorgensen, Generating a Pattern Matching Compiler by Partial Evaluation, DIKU, Department of Computer Science University of Copenhagen, Denmark, 1994, pp. 1-8.*

(Continued)

*Primary Examiner* — Thuy Dao
*Assistant Examiner* — Mongbao Nguyen
(74) *Attorney, Agent, or Firm* — Steven M. Greenberg, Esq.; Carey, Rodriguez, Greenberg & O'Keefe

(57) ABSTRACT

Embodiments of the present invention address deficiencies of the art in respect to pattern matcher generation and provide a method, system and computer program product for automatic pattern matching and generation of intermediate language patterns. In one embodiment of the invention, a pattern matcher generation method can be provided. The method can include identifying input elements from intermediate language code, reducing the identified input elements from the intermediate language code to inputs of common and unique use, creating a unifiable form for each of the input elements of common and unique use, and generating a pattern matcher for each of the input elements of common and unique use in the intermediate language code using a corresponding unifiable form in place of each of the input elements of common and unique use. In particular, the generated pattern matcher can be expression matching and transformation programming framework (EMTF) conformant.

20 Claims, 2 Drawing Sheets

OTHER PUBLICATIONS

Claude Kirchner, Formal Validation of Pattern Matching Code, 2005, pp. 1-6.*

Ferenc, Rudolf, et al; Recognizing Design Patterns in C++ Programs with the Integratin of Columbus and Maisa; ACTA Cybernetica (2002); vol. 15, No. 4, pp. 669-682.

Marlet, Renaud, et al; Efficient Implementations of Software Architectures via Partial Evaluation; Automated Software Engineering; 12th IEEE Int'l Conference on Automated Software Engineering (1997); published Oct. 1999; vol. 6, No. 4, pp. 411-439.

* cited by examiner

CONDENSING PATTERN MATCHER GENERATION FOR INTERMEDIATE LANGUAGE PATTERNS

BACKGROUND OF THE INVENTION

1. Field of the Invention

The present invention relates to the field of program code compilation and more particularly to matching intermediate language patterns during code compilation.

2. Description of the Related Art

Program code compilation refers to the transformation of a computer program embodied by source code into machine instructions executable by a central processor unit (CPU) in a computing system. Generally, during program code compilation, the compiler parses the source code for the computer program in order to generate an intermediate representation for the computer program. In particular, the intermediate representation can provide a stack-based representation of the programmatic expressions of the computer program.

The intermediate representation of the code in turn can be transformed into machine executable instructions. The transformation of the intermediate representation of the code into machine executable instructions ordinarily involves the pattern matching of intermediate language expressions and the emission of templated instructions specific to the target platform. Pattern Matchers can also be used in compiler optimization transformations that rely on recognizing idioms (that is, commonly used programmatic practices and algorithms) in the program being compiled. In these cases, the transformations promoted by the pattern matchers would modify the intermediate representation (rather than generate code directly), as other optimization transformation of the intermediate representation may be enabled as a result. Pattern matchers can be written manually to suit a specific target platform, or pattern matchers can be generalized to accommodate multiple different target platforms.

Pattern matchers can also be written manually to match a specific programming idiom in the input, or generalized to match multiple variations of the programming idiom. As an example, United States Patent Application Publication Nos. 2006/0206876 and 2006/0048122 by Christopher Barton et al. and United States Patent Application Publication No. 2007/0088697 by Charlebois et al. each disclose an expression matching and transformation programming framework (EMTF) for pattern matching of intermediate representation and for transforming intermediate language expression trees, such that pattern matching can be embedded within a source program.

The use of an EMTF to define a pattern matcher provides inherent advantages including the ease of embedding the pattern matchers within compiler code and the similarity of the EMTF syntax to the abstract representation of intermediate representation expressions. Still, the use of EMTF requires a significant learning curve and EMTF can be somewhat confusing for the developer when designing patterns for matching without the requisite experience in pattern matching. In addition, it can be time-consuming to correctly design pattern matchers for very large input patterns. Pattern matchers in general can be too precise and often fail to catch input patterns that observe the same desired behavior using slightly different code, for example different symbols, constants, labels, and the like. In particular, it is well known that symbol identifiers used in intermediate language representation often can be assigned to symbols that vary depending upon the compiled source file. Additionally, pattern matchers generally are designed to capture a specific set of patterns. Where other inputs that observe the desired behavior can be found, additional pattern matchers must be added to disambiguate the found inputs. Alternatively, existing pattern matchers must be extended to recognize the additional inputs observing the desired behavior. Finally, changes in the behavior of a compiler inherent to the development cycle of the compiler can result in even the most flexible pattern matchers failing to match or incorrectly matching an input if the input to the pattern matcher changes due to an implementation change or a new optimization added to the compiler. Consequently, pattern matchers typically are avoided in optimizers for optimizing compiled code.

BRIEF SUMMARY OF THE INVENTION

Embodiments of the present invention address deficiencies of the art in respect to pattern matcher generation and provide a novel and non-obvious method, system and computer program product for automatic generation of pattern matchers for intermediate language input elements. In one embodiment of the invention, a pattern matcher generation method can be provided. The method can include identifying input elements (symbols, labels, literals and sub-expressions) of an input element from intermediate language code, reducing the identified input elements from the intermediate language code to input elements of common and unique use, creating a unifiable form for each of the input elements of common and unique use, and generating a pattern matcher for the input elements from the intermediate language code using the corresponding unifiable form in place of each of the input elements of common and unique use. In particular, the generated pattern matcher can be EMTF conformant.

In one aspect of the embodiment, reducing the identified input elements from the intermediate language code to input elements of common and unique use can include adding each of the input elements from the intermediate language code to a table of input elements of common and unique use upon first appearance in the intermediate language code, counting each additional appearance of the input elements in the intermediate language code, and removing input elements from the table with a count indicating only a single use in the input from the intermediate language code. Similarly, in another aspect of the embodiment, reducing the identified input elements from the intermediate language code to input elements of common and unique use further can include identifying each of the input elements in the table appearing only as part of a sub-expression for another of the input elements, and removing input elements from the table lacking a unique use in the intermediate language code.

In another embodiment of the invention, a code development data processing system can be provided. The system can include a compiler configured to produce intermediate language code for source code and a table of input elements of common and unique use. The system also can include pattern matcher generation logic coupled to the table. The logic can include program code enabled to populate the table with input elements in the input from the intermediate language code, to reducing the identified input elements in the table to input elements of common and unique use in the intermediate language code, to creating a unifiable form for each of the input elements of common and unique use in the table, and to generate a pattern matcher for the input from intermediate language code using the corresponding unifiable form in the table in place of each of the input elements of common and unique use.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for condensing pattern matcher generation for intermediate language patterns. In accordance with an embodiment of the present invention, input elements for an input from intermediate language code produced from a compilation of source code can be placed in a table of input elements and condensed to include only common ones of the input elements having unique uses. Thereafter, unifiable forms of the remaining input elements in the table can be generated and stored in the table of input elements each in association with a corresponding one of the remaining input elements in the table of input elements. Finally, a pattern matcher can be generated for the the input from intermediate language code using the unifiable forms corresponding to the remaining entries in the table of input elements, and precise matching forms for input elements not in the table.

Figure 1:
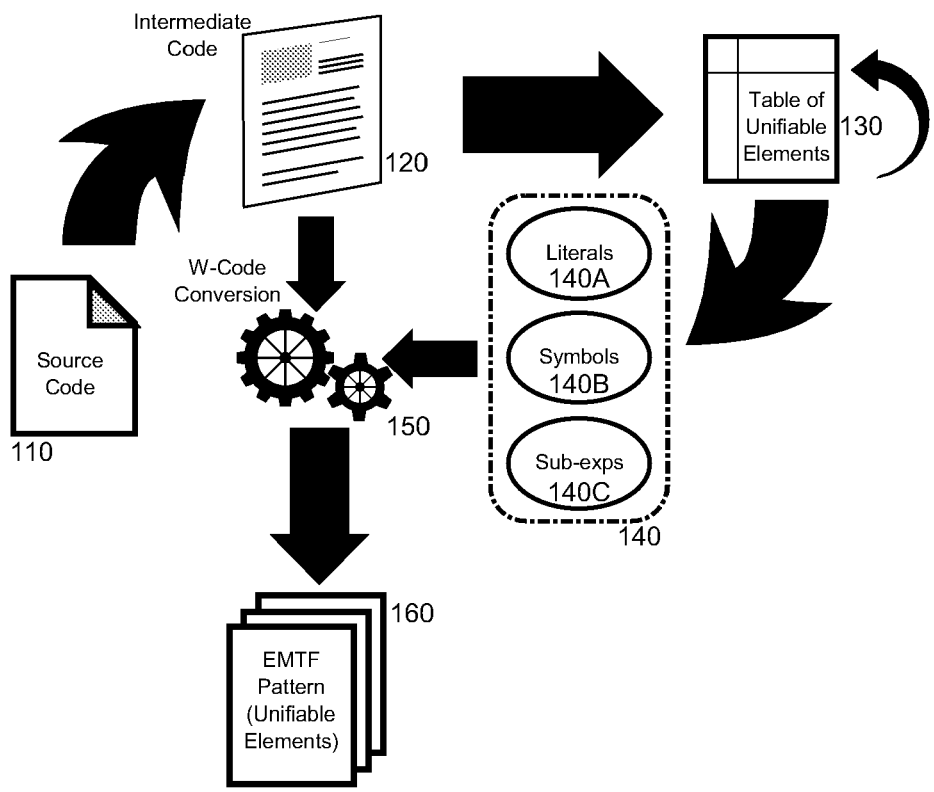
FIG. 1 is a pictorial illustration of a process for condensing pattern matcher generation for intermediate language patterns.

In further illustration, FIG. 1 is a pictorial illustration of a process for condensing pattern matcher generation for an intermediate language input. As shown in FIG. 1, source code 110 can be compiled into intermediate language code 120. A table of input elements 130 can be populated with the input elements of the input from intermediate language code 120, namely statements of the intermediate code 120 including literal elements, symbols, labels, and sub-expressions containing other elements and symbols in the table of input elements 130 across multiple different expression trees in an input sequence. Specifically, each of the input elements in the input sequence can be derived from an expression tree of the intermediate language representation.

The table of input elements 130 can be reduced to include only common literal elements that appear multiple times within the intermediate code 120. Additionally, the table of input elements 130 can be further reduced to remove common literal elements appearing as part of sub-expressions in the intermediate code 120 so as to have respectively unique uses within the intermediate code 120. Finally, the remaining common literal elements in the table can be transformed into unifiable forms 140 of the common literal elements. The unifiable forms 140 can include, by way of example, unifiable literals 140A, unifiable symbols 140B, unifiable labels and unifiable sub-expressions 140C. Thereafter, pattern matcher generation process 150 can generate a single pattern 160 for the intermediate code 120 by replacing the input elements found in the intermediate code 120 with corresponding ones of the unifiable forms 140 with reference to the table of input elements 130, and by replacing the input elements not found in the table of input elements of common and unique use with precise matching forms, such that the input elements demonstrating multiple unique uses within the intermediate code 120 result in a single generated pattern 160.

Figure 2:
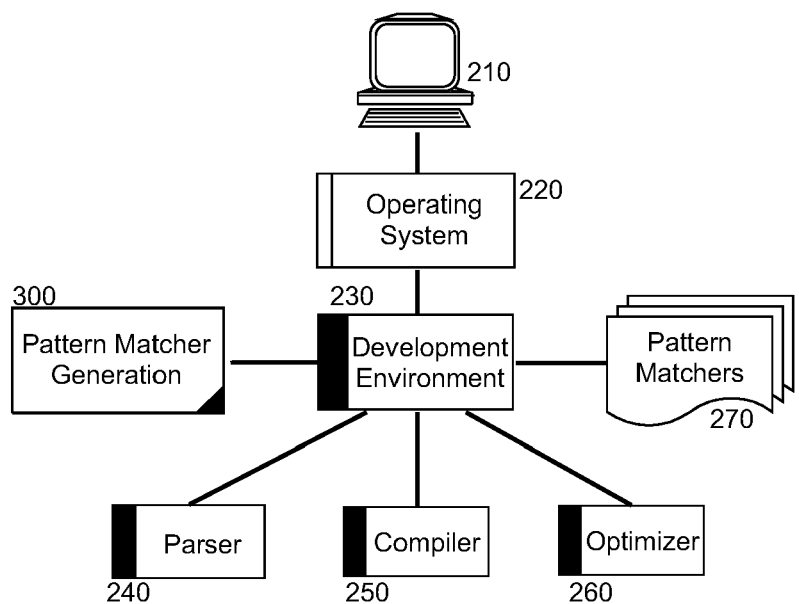
FIG. 2 is a schematic illustration of a code development data processing system configured for condensing pattern matcher generation for intermediate language patterns; and, FIG. 3 is a flow chart illustrating a process for condensing pattern matcher generation for intermediate language patterns.

The pattern matcher generation process shown in FIG. 1 can be implemented in a code development data processing system. In illustration, FIG. 2 schematically depicts a code development data processing system configured for condensing pattern matcher generation for intermediate language patterns. The system can include a host computing platform 210 supporting the execution of an operating system 220. The operating system 220 can host a development environment 230 providing a parser 240, compiler 250 and optimizers 260 in producing compiled objects for use in a computer program.

Pattern matcher generation logic 300 can be coupled to the development environment 230 and can include program code enabled to generate different pattern matchers 270 for use by the compiler 250 and optimizer 260 in producing optimized compiled objects. In this regard, the pattern matchers 270 can be C++ source code and EMTF conformant pattern matchers and can be generated by the program code to match the inputs of intermediate code produced by the compiler 250 using unifiable forms of the input elements representing common, unique uses of the input elements within the input from intermediate language code. In this way, the program code of the pattern matcher generation logic 300 can be enabled to generate an optimal set of the pattern matchers 270 while permitting flexibility in manually modifying the pattern matchers 270 to suit specific needs while further providing readability in utilizing a EMTF-like syntax for the unifiable forms and for the precise matching forms.

Figure 3:
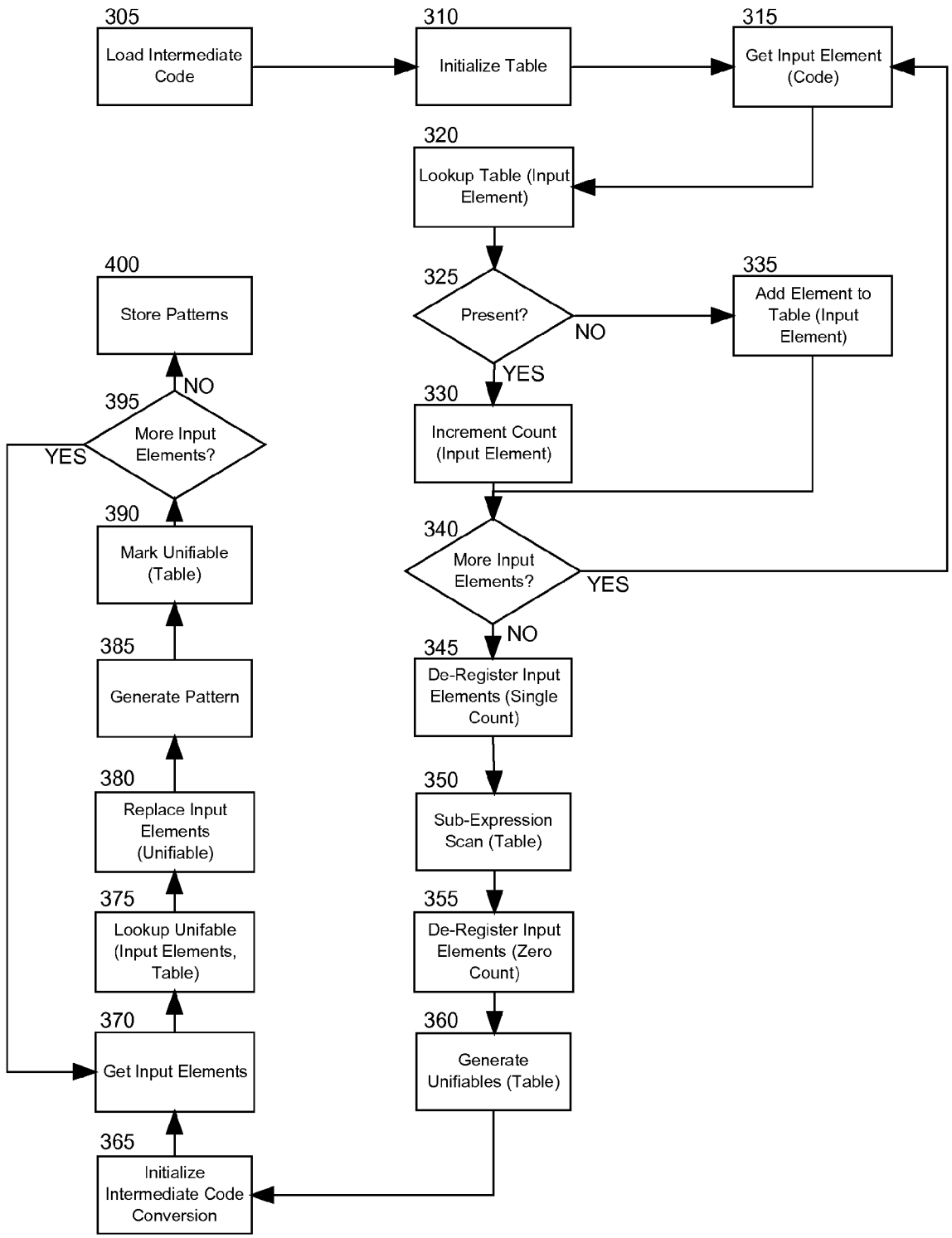

In illustration of the operation of the pattern matcher generation logic 300, FIG. 3 is a flow chart illustrating a process for condensing pattern matcher generation for intermediate language patterns. Beginning in block 305, intermediate code produced through the compilation of source code can be loaded for processing and in block 310, a table of input elements (and corresponding unifiable forms) can be initialized for population. In block 315 a first input element in the input from intermediate language code can be identified and in block 320, the table can be consulted to determine in decision block 325 whether or not the input element is present in the table. If so, in block 330 a counter associated with the input element in the table can be incremented to reflect a number of uses in the input from intermediate language code. Otherwise, in block 335 the input can be added to the table with a count indicating a single use in the input intermediate language code.

In decision block 340, if additional input elements can be found in the input from intermediate language code, the process can return through block 315 in which a next input element can be retrieved for processing. In decision block 340 when no further input elements remain to be processed in the intermediate code, in block 345 those input elements in the table having a count indicating a single use only can be de-registered from the table leaving only those input elements having common, multiple uses in the input from intermediate language code. Thereafter, in block 350 the table can be scanned for each input element containing another input element in the table. For each located input element appearing as part of another input element, the count for the located input element can be reduced and in block 355, those input elements having a zero count can be de-registered from the table as lacking a unique use in the input from intermediate language code.

In block 360, the remaining input elements having unique, common uses in the input from intermediate language code can be transformed into unifiable form. The unifiable form of a literal element can include the syntax "Unifiable_{type} literal#" and can be registered in connection with the literal element in the table. Similarly, the unifiable form of a symbol element can include the syntax "UnifiableSymbol symbol#" and can be registered in connection with the symbol element in the table. Similarly, the unifiable form of a label element can include the syntax "UnifiableLabel label#" and can be registered in connection with the label element in the table. Finally, the unifiable form of a sub-expression element can include the syntax "UnifiableExpression expression#" and can be registered in connection with the sub-expression element in the table.

In block 365, the input from intermediate language code can be initialized for conversion in generating a pattern matcher for the input from intermediate language code and in block 370 a first input element in the input from intermediate language code can be selected for processing. In block 375, the selected input element can be located in the table and in block 380 the selected input element can be replaced with a unifiable form for the selected input element specified in an entry for the input element in the table. In block 385, the table entry can be marked as processed so that other input elements resolving to the same entry in the table need not require conversion into a unifiable form. In decision block 395, if additional input elements remain to be processed in the input from intermediate language code, the process can repeat through block 370. When no further input elements remain to be processed in the input from intermediate language code, in block 400 a pattern matcher gets generated for the input from intermediate language code using the unifiable corresponding to the input elements of common and unique use.

Thus, for every sub-expression, symbol or literal input element found in the input from intermediate language code, the input element can be located in the table. Once the input element has been found in the table, a variable name instead of the represented input element can be generated, and the common input element in the table can be marked as 'computed' indicating that a first use of the input element has been located and further uses will need to be mapped to the same unifiable form, in order to apply the constraint of common and unique use in the pattern matcher that will be finally generated.

As an exception, however, in a UnifiableExpression though the sub-expression may appear multiple times in the intermediate code, and in order to not allow any sub-expression to be matched in that case, more 'precise' pattern matching will be conservatively used for the sub-expression. To that end, a phrase "e#={pattern}" pattern can be generated for that sub-expression in the finally generated pattern matcher, where e# is the unifiable variable registered for that sub-expression in the table, and {pattern} is the 'precise' matching pattern generated for the actual sub-expression. This exceptive process can be performed only on the first detected use of the sub-expression where the sub-expression has been marked 'computed'. For the remaining uses the "e#" unifiable variable syntax can be used directly.

The skilled artisan will recognize the advantage of the representation illustrated in FIGS. 1 and 3 as the representation is compact in that only the requisite unified variables are generated and the commonalities in an input can be represented in a single pattern matcher, with an end result that is easy to generalize upon. Further, in an aspect of the embodiment, the use of EMTF provides an ease of expressing complex pattern matchers. Finally, pattern matchers can be generated for large inputs. Though EMTF incurs some overhead during pattern matcher initialization, the pattern matcher generation logic described herein creates two patterns: a short pattern where the length is set by a parameter; and, a full pattern. The short pattern can be used to match against part of the input and, if the initial match succeeds, the full pattern can be matched against the whole input. Consequently, a higher probability of matching can be assured before incurring the overhead.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A pattern matcher generation method executable by a processor comprising:

identifying input elements from intermediate language code;

reducing the identified input elements from the intermediate language code to input elements of common and unique use;

creating a unifiable form for each of the input elements of common and unique use; and, generating a pattern matcher for the input elements from the intermediate language code using the unifiable form in place of each of the input elements of common and unique use.

2. The method of claim 1, wherein identifying input elements from intermediate language code, comprises identifying input literals, symbols and sub-expressions from intermediate language code.

3. The method of claim 1, wherein reducing the identified input elements from the intermediate language code to input elements of common and unique use, comprises:

adding each of the input elements from the intermediate language code to a table upon first appearance in the intermediate language code;

counting each additional use of the input elements in the intermediate language code; and, removing input elements from the table with a count indicating only a single use in the input from the intermediate language code.

4. The method of claim 3, wherein reducing the identified input elements from the intermediate language code to input elements of common and unique use, further comprises:

identifying each of the input elements in the table appearing only as part of a sub-expression for another of the input elements in the intermediate language code; and, removing input elements from the table lacking a unique use in the input elements in the intermediate language code.

5. The method of claim 2, wherein creating a unifiable form for each of the input elements of common and unique use, comprises creating a unifiable form of a literal for each literal element of common and unique use in the intermediate language code.

6. The method of claim 2, wherein creating a unifiable form for each of the input elements of common and unique use, comprises creating a unifiable form of a symbol for each symbol element of common and unique use in the intermediate language code.

7. The method of claim 2, wherein creating a unifiable form for each of the input elements of common and unique use, comprises creating a unifiable form of a label for each label element of common and unique use in the intermediate language code.

8. The method of claim 2, wherein creating a unifiable form for each of the input elements of common and unique use, comprises creating a unifiable form of a sub-expression for each sub-expression element of common and unique use in the intermediate language code.

9. The method of claim 1, wherein generating a pattern matcher for the input elements from the intermediate language code using a corresponding unifiable form in place of each of the input elements of common and unique use, comprises generating an expression matching and transformation programming framework (EMTF) conformant pattern matcher for the input elements from the intermediate language code using a corresponding unifiable variable in place of each of the input elements of common and unique use.

10. A code development data processing system having a processor comprising:

a compiler configured to produce intermediate language code for source code; a table of unifiable inputs; and, pattern matcher generation logic coupled to the table, the logic comprising program code enabled to populate the table with input elements from the intermediate language code, to reduce the identified inputs in the table to input elements of common and unique use in the intermediate language code, to create a unifiable form for each of the input elements of common and unique use in the table, and to generate a pattern matcher for the input elements from the intermediate language code using the unifiable form in place of each of the input elements of common and unique use.

11. The system of claim 10, wherein the pattern matchers are expression matching and transformation programming framework (EMTF) conformant pattern matchers.

12. A computer program product comprising a computer usable storage memory storing computer usable program code for pattern matcher generation, the computer program product comprising:

computer usable program code for identifying input elements from intermediate language code;

computer usable program code for reducing the identified input elements from the intermediate language code to input elements of common and unique use;

computer usable program code for creating a unifiable form for each of the input elements of common and unique use; and, computer usable program code for generating a pattern matcher for the input elements from the intermediate language code using the unifiable form in place of each of the input elements of common and unique use.

13. The computer program product of claim 12, wherein the computer usable program code for identifying input elements from intermediate language code, comprises computer usable program code for identifying input literals, symbols and sub-expressions from intermediate language code.

14. The computer program product of claim 12, wherein the computer usable program code for reducing the identified input elements from the intermediate language code to input elements of common and unique use, comprises:

computer usable program code for adding each of the input elements from the intermediate language code to a table upon first appearance in the intermediate language code;

computer usable program code for counting each additional use of the input elements in the intermediate language code; and, computer usable program code for removing input elements from the table with a count indicating only a single use in the input from the intermediate language code.

15. The computer program product of claim 14, wherein the computer usable program code for reducing the identified input elements from the intermediate language code to input elements of common and unique use, further comprises:

computer usable program code for identifying each of the input elements in the table appearing only as part of a sub-expression for another of the input elements in the intermediate language code; and, computer usable program code for removing input elements from the table lacking a unique use in the input elements in the intermediate language code.

16. The computer program product of claim 13, wherein the computer usable program code for creating a unifiable form for each of the input elements of common and unique use, comprises computer usable program code for creating a unifiable form of a literal for each literal element of common and unique use in the intermediate language code.

17. The computer program product of claim 13, wherein the computer usable program code for creating a unifiable form for each of the input elements of common and unique use, comprises computer usable program code for creating a unifiable form of a symbol for each symbol element of common and unique use in the intermediate language code.

18. The computer program product of claim 13, wherein the computer usable program code for creating a unifiable form for each of the input elements of common and unique use, comprises computer usable program code for creating a unifiable form of a label for each label element of common and unique use in the intermediate language code.

19. The computer program product of claim 13, wherein the computer usable program code for creating a unifiable form for each of the input elements of common and unique use, comprises computer usable program code for creating a unifiable form of a sub-expression for each sub-expression element of common and unique use in the intermediate language code.

20. The computer program product of claim 12, wherein the computer usable program code for generating a pattern matcher for the input elements from the intermediate language code using a corresponding unifiable form in place of each of the input elements of common and unique use, comprises computer usable program code for generating an expression matching and transformation programming framework (EMTF) conformant pattern matcher for the input elements from the intermediate language code using a corresponding unifiable variable in place of each of the input elements of common and unique use.

* * * * *